United States Patent
Drexel et al.

(10) Patent No.: US 10,375,510 B2
(45) Date of Patent: *Aug. 6, 2019

(54) METHOD AND APPARATUS FOR PROVIDING LOCATION INFORMATION FOR A WIRELESS COMMUNICATION DEVICE

(71) Applicant: AT&T INTELLECTUAL PROPERTY I, L.P., Atlanta, GA (US)

(72) Inventors: Jonathan Drexel, Plano, TX (US); William Drexel, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,051

(22) Filed: May 19, 2017

(65) Prior Publication Data
US 2017/0257736 A1 Sep. 7, 2017

Related U.S. Application Data

(63) Continuation of application No. 14/640,333, filed on Mar. 6, 2015, now Pat. No. 9,686,642.

(51) Int. Cl.
*H04W 4/02* (2018.01)
*H04W 4/60* (2018.01)

(52) U.S. Cl.
CPC ............. *H04W 4/02* (2013.01); *H04W 4/60* (2018.02)

(58) Field of Classification Search
CPC ....... H04W 4/02; H04W 4/008; H04W 64/00; H04W 4/024; H04W 4/029; H04W 4/04; H04W 4/043; H04W 4/046
See application file for complete search history.

(56) References Cited

U.S. PATENT DOCUMENTS 7,991,434 B2 8/2011 Yen et al.
8,032,182 B2 10/2011 Bennett
(Continued)

FOREIGN PATENT DOCUMENTS

CN 102073903 5/2011
CN 202041977 U 11/2011
(Continued)

OTHER PUBLICATIONS

Aamoth, Doug , "GPS receivers to be embedded into SIM cards", International CES 2015, Nov. 18, 2008, 7 pages.
(Continued)

*Primary Examiner* — Dinh Nguyen
(74) *Attorney, Agent, or Firm* — Guntin & Gust, PLC; Atanu Das (57) ABSTRACT

Aspects of the subject disclosure may include, for example, a SIM card obtaining GPS location data, second location data and communication session measurement data; monitoring for a wireless network connection between a controller of a wireless device and a wireless network; and, responsive to a failure to detect the wireless network connection, providing the aggregated location data to a wireless communication circuit of the SIM card for wireless transmitting via an antenna of the SIM card to a wireless access point to cause the wireless access point to transmit the aggregated location data to a location server. Other embodiments are disclosed.

20 Claims, 7 Drawing Sheets

(56) References Cited

U.S. PATENT DOCUMENTS

| | | | |
|---|---|---|---|
| 8,731,578 B2 | 5/2014 | Jolivet | |
| 8,855,627 B2 | 10/2014 | Ding et al. | |
| 2004/0095924 A1 | 5/2004 | Holur et al. | |
| 2004/0106415 A1* | 6/2004 | Maeda | G01S 5/0027 |
| | | | 455/456.1 |
| 2006/0094400 A1* | 5/2006 | Beachem | H04L 63/101 |
| | | | 455/410 |
| 2008/0039115 A1 | 2/2008 | Haugh Hans-Christian et al. | |
| 2008/0114829 A1* | 5/2008 | Button | H04W 4/02 |
| | | | 709/203 |
| 2009/0088181 A1 | 4/2009 | Savolainen | |
| 2009/0143080 A1 | 6/2009 | Brede et al. | |
| 2010/0293613 A1 | 11/2010 | Hum | |
| 2010/0317369 A1 | 12/2010 | Stranges et al. | |
| 2011/0026506 A1 | 2/2011 | Macnaughtan et al. | |
| 2011/0187591 A1* | 8/2011 | Walker, Sr. | G01S 19/46 |
| | | | 342/357.29 |
| 2012/0083291 A1* | 4/2012 | Thomson | H04W 4/02 |
| | | | 455/456.2 |
| 2012/0290481 A1 | 11/2012 | Finkenzeller et al. | |
| 2014/0299667 A1 | 10/2014 | Baek | |
| 2014/0328190 A1* | 11/2014 | Lord | H04W 24/08 |
| | | | 370/252 |
| 2016/0029195 A1* | 1/2016 | Leahy | H04M 1/72538 |
| | | | 455/404.2 |
| 2016/0261980 A1 | 9/2016 | Drexel et al. | |

FOREIGN PATENT DOCUMENTS

| | | |
|---|---|---|
| CN | 202362822 U | 8/2012 |
| KR | 2010025564 | 3/2010 |
| KR | 2011049632 | 5/2011 |

OTHER PUBLICATIONS

Davies, Chris, "SIM card with integrated GPS from Sagem Orga & BlueSky", SlashGear, Nov. 20, 2008, 7 pages.

* cited by examiner

METHOD AND APPARATUS FOR PROVIDING LOCATION INFORMATION FOR A WIRELESS COMMUNICATION DEVICE

CROSS-REFERENCE TO RELATED APPLICATION

This application is a continuation of and claims priority to U.S. patent application Ser. No. 14/640,333, filed Mar. 6, 2015, which is incorporated herein by reference in its entirety.

FIELD OF THE DISCLOSURE

The subject disclosure relates to a method and apparatus for providing location information for a wireless communication device.

BACKGROUND

Users often desire to know their present location. Location-based services (e.g., navigation applications) utilize present locations to provide communication services. The accuracy of the location determination can impact the service being provided by the wireless device. For example, GPS-based navigation services within a city that has tall buildings can be inaccurate or sometimes unavailable.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for collecting and distributing data, via a Subscriber Identity Module (SIM card) that facilitates providing location-based services to end user devices. In one or more embodiments, a SIM card can be provided that can operate independently of the wireless device processor and the wireless device antenna to collect and distribute the data. The SIM card can include a SIM antenna, a wireless communication circuit (e.g., a WiFi chip), a Global Positioning System (GPS) chip and a storage device. The SIM card can collect multiple forms of location data (e.g., GPS location data, WiFi location data, cellular location data) and can provide the aggregate of this data to a location server via a network connection or via a wireless transmission over the WiFi chip (or other communication mode of the SIM card) and/or can store the location data until a wireless connection is available to transmit the data.

The SIM card described with respect to the exemplary embodiments can be any type of identity module that is utilized by a wireless device including full-size SIM, mini SIM, micro SIM, nano SIM, embedded SIM, Universal Integrated Circuit Card (UICC), or smart card. Other embodiments are described in the subject disclosure.

One embodiment of the subject disclosure is a communication device including a first memory that stores first executable instructions, a first antenna, a controller coupled with the first memory and the first antenna where the controller responsive to executing the first executable instructions provides wireless communication services via the first antenna including establishing wireless communication sessions with other communication devices, and a subscriber identity module including a second antenna, a GPS circuit, a WiFi circuit, a processor and a second memory that stores second executable instructions. The processor, responsive to executing the second executable instructions, facilitates performance of operations including obtaining, via the GPS circuit and the second antenna, GPS location data. The processor can obtain, via the WiFi circuit and the second antenna, WiFi location data. The processor can obtain, via the controller and the first antenna, communication session measurement data. The processor can store the GPS location data, the WiFi location data and the communication session measurement data in the second memory as aggregated location data. The processor can, responsive to a detection of a wireless network connection between the controller (via the first antenna) and a wireless network, provide the aggregated location data to the controller for wireless transmitting to a location server. The processor can, responsive to a failure to detect the wireless network connection between the controller and the wireless network, provide the aggregated location data to the WiFi circuit for wireless transmitting via the second antenna to a wireless access point to cause the wireless access point to transmit the aggregated location data to the location server. In one embodiment, in the event of a failure to detect the wireless network or a wireless access point, the location information data can be placed in storage on the eSIM by the processor until the data can be transmitted by either the wireless network or a wireless access point.

One embodiment of the subject disclosure is a machine-readable storage medium, including executable instructions that, when executed by a processor of a subscriber identity module of a wireless communication device, facilitate performance of operations, including obtaining, via a GPS circuit and a second antenna of the subscriber identity module, GPS location data. The processor can obtain, via the second antenna and a wireless communication circuit of the subscriber identity module, second location data. The processor can obtain, via a controller and a first antenna of the wireless communication device, communication session measurement data. The processor can store the GPS location data, the second location data and the communication session measurement data in a memory of the subscriber identity module as aggregated location data. The processor can monitor for a wireless network connection between the controller, via the first antenna, and a wireless network. The processor can, responsive to a failure to detect the wireless network connection between the controller and the wireless network, provide the aggregated location data to the wireless communication circuit for wireless transmitting via the second antenna to a wireless access point to cause the wireless access point to transmit the aggregated location data to a location server.

One embodiment of the subject disclosure is a method that includes receiving, by a system including a processor, aggregated location data from a WiFi circuit and a second antenna of a subscriber identity module of a wireless communication device without receiving the aggregated location data from a controller and a first antenna of the wireless communication device. The controller and the first antenna enable wireless communication services for the wireless communication device. The aggregated location data includes GPS location data, WiFi location data, and communication session measurement data. The GPS location data is collected by a GPS circuit of the subscriber identity module. The WiFi location data is collected by the WiFi circuit of the subscriber identity module. The communication session measurement data is collected by the controller of the wireless communication device. The method includes analyzing the aggregated location data to determine a location of the wireless communication device and transmitting the location of the wireless communication device to the wireless communication device to enable the controller to provide a location-based service at the wireless communication device.

Figure 1:
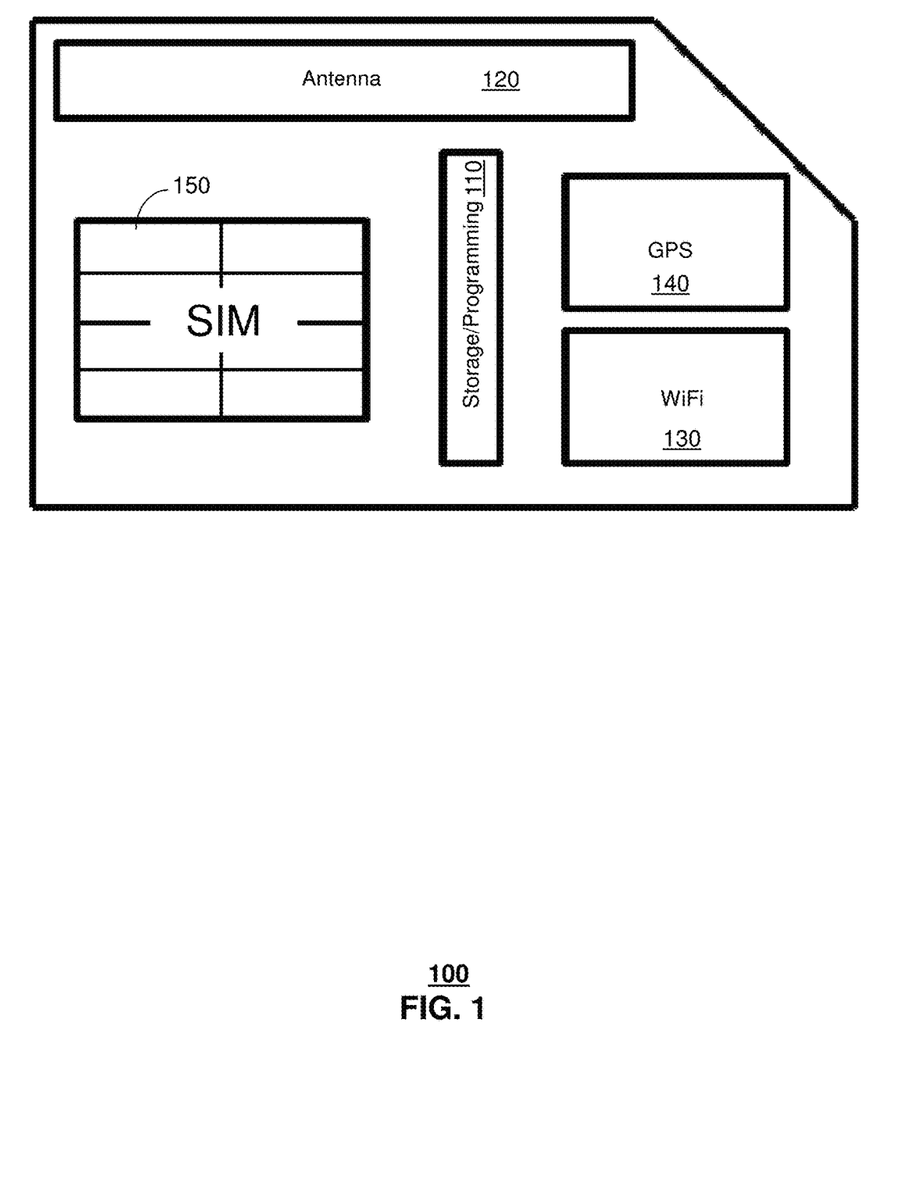
FIG. 1 depicts an illustrative embodiment of a subscriber identity module that enables the transmission of location data.

FIG. 1 depicts an illustrative embodiment of a SIM card 100 that enables exchange of location information so that location-based services can be provided to a wireless communication device. The wireless communication device can be a mobile device (e.g., a mobile phone, tablet, laptop computer, vehicle navigation system, and so forth) or a fixed device. For example, the wireless device can be installed in a vending machine that keeps track of inventory. The SIM card 100 placed in that wireless device can provide greater location accuracy to tell the vendor's delivery person exactly where the machine is located (e.g., within a building or on a campus) that needs additional supplies.

SIM card 100 can include a processor 110 that can include a storage device integrated therewith or separately located on the SIM card. The SIM card 100 can also include a SIM antenna 120, a wireless communication circuit 130 (e.g., a WiFi circuit), a GPS circuit 140, and/or a SIM chip 150.

SIM card 100 enables providing more accurate location data for the wireless communication device. In one embodiment, SIM card 100 can enhance the capabilities of SIM and/or storage devices by incorporating the above-features into the SIM card to capture, store, process, and/or transmit location data independent of whether the wireless communication device is a connected device. SIM card 100 can incorporate or otherwise provide for Standard SIM, Mini SIM, Micro SIM, Nano SIM, and/or storage devices, as well as future iterations of SIM and storage devices on 2G, 3G, 4G, 5G, and so forth technology.

The GPS circuit 140 can be a GPS chip embedded into the SIM card with the SIM antenna also embedded into the SIM card so that the SIM card has the ability to capture satellite location data independently of a connected device.

The wireless communication circuit 130 can be a WiFi chip embedded into the SIM card 100 that serves as a data collection device as well as an optional data transfer point. The SIM card can collect and aggregate location data, as well as other data associated with the use of the wireless communication device, to create greater predictive accuracy about the precise location of the SIM card and the wireless communication device. In one embodiment, the aggregated data can be provided to a remote server, such as via the WiFi circuit 130 and the SIM antenna 120, so that the remote server (e.g., a network location server) can calculate a more accurate location of the wireless communication device. SIM card 100 also provides increased storage capabilities to accommodate the storage of collected location data, as well as other data. The increased storage allows for collection of data over longer periods of time and transmitting of that data at more appropriate times, including for example when wireless network or access point connectivity is available.

The SIM chip 150 can be used for identifying subscriber services, executing programs, storing subscriber data, and so forth. In one embodiment, the SIM chip 150 can communicate with a wireless network via one or both of the antenna 120 (e.g., via a WiFi transmission using WiFi circuit 130) or the phone's antenna (using a cellular transmission). The SIM chip 150 can be used for various purposes including facilitating establishing communication services and provisioning of the wireless communication device.

In one embodiment, the SIM card 100 can be a removable identity module that can be removably connected with a wireless communication device (e.g., a mobile phone) that provides wireless communication services via the devices controller and antenna, including voice, video, data and/or messaging services. The SIM card 100 can obtain GPS location data via the GPS circuit 140 and the SIM antenna 120, independently of whether there is a network connection for the mobile phone. The SIM card 100 can obtain WiFi location data via the WiFi circuit 130 and the SIM antenna 120, independently of whether there is a network connection for the mobile phone. The SIM card 100 can obtain, via the phone's controller and the phone's antenna, communication session measurement data. The SIM card 100 can store the GPS location data, the WiFi location data and the communication session measurement data (as aggregated location data) in a memory of the SIM card 100 (which is shown in FIG. 1 as an integrated storage with processor 110 but could also be a separate storage device embedded in the SIM card). The collection of data is not limited to location information and can include other data as well including for example performance parameters associated with the phone (e.g., RSSI data or other signal parameters), diagnostic data for the phone, consumption history for the phone (e.g., a history of websites visits and/or content presented), phone configurations, contact list data, calendar data, time-stamp data, WiFi access point identification data, geo-fence information, and so forth. This example is described with respect to a wireless device that is a mobile device (i.e., a mobile phone), but is also applicable to other types of wireless devices, including mobile wireless devices and fixed wireless devices.

In one embodiment, the processor 110 can determine the most efficient method of transmitting the aggregated data or can determine a desired method of transmitting the aggregated data. For example, responsive to a detection of a wireless network connection between the phone's controller and a wireless network (via the phone's antenna), the processor 110 of the SIM card 100 can provide the aggregated location data to the controller for wireless transmitting to a location server. However, responsive to a failure to detect the wireless network connection between the phone's controller and the wireless network, the processor 110 of the SIM card 100 can provide the aggregated location data to the WiFi circuit 130 for wireless transmitting via the SIM antenna 120, such as to a wireless access point to cause the wireless access point to transmit the aggregated location data to the location server.

In one embodiment, the failure to detect the wireless network connection between the phone's controller and the wireless network can be based on: monitoring for the wireless network connection between the phone's controller, via the first antenna, and the wireless network over a time period; and providing the aggregated location data to the WiFi circuit after expiration of the time period.

In one embodiment, the communication session measurement data can include signal round trip time information. In one embodiment, the storing of the aggregated location data in the SIM card memory is performed without storing the aggregated location data in a separate memory of the phone device.

In one embodiment, the SIM card 100 can obtain device diagnostic data from the phone's controller, such as performance measurements for operations of the mobile phone; store the device diagnostic data in the SIM card memory; responsive to detecting a wireless network connection between the phone's controller (via the first antenna) and the wireless network, provide the device diagnostic data to the phone's controller for wireless transmitting to a diagnostics server; and responsive to a failure to detect the wireless network connection between the phone's controller and the wireless network, provide the device diagnostic data to the WiFi circuit 130 for wireless transmitting via the SIM antenna 120 to the wireless access point to cause the wireless access point to transmit the aggregated location data to the diagnostics server.

In one embodiment, the SIM card 100, by way of collecting and transmitting the aggregated location data, can enable location-based services at the mobile phone including receiving product, location or other information associated with a product in proximity to the mobile phone, where the product information is received via one or both of the SIM antenna or the phone's antenna from a content server responsive to the content server receiving a location of the mobile phone from the location server, and where the location of the mobile phone is determined based on an analysis of the aggregated location data by the location server. In one embodiment, the product information can include a coupon associated with the product, and the location of the mobile phone can indicate the proximity with respect to the product.

In one embodiment, the collecting and transmitting of the aggregated data by the SIM card 100 can enable a location-based service, where the location-based service is provided via the phone's antenna from a network application server responsive to the network application server receiving a location of the mobile phone from the location server, and where the location of the mobile phone is determined based on an analysis of the aggregated location data by the location server.

In one embodiment, the phone's controller, via the phone's antenna, can receive a location of the mobile phone from the location server, where the location of the mobile phone is determined based on an analysis of the aggregated location data by the location server.

In one embodiment, the processor 110, via the SIM antenna 120 and the WiFi circuit 130, can receive a location of the mobile phone from the location server, where the location of the mobile phone is determined based on an analysis of the aggregated location data by the location server.

In one embodiment, the processor 110 can receive the location via the SIM antenna 120 and the WiFi circuit 130 responsive a lack of the wireless network connection between the phone's controller and the wireless network.

Figure 2:
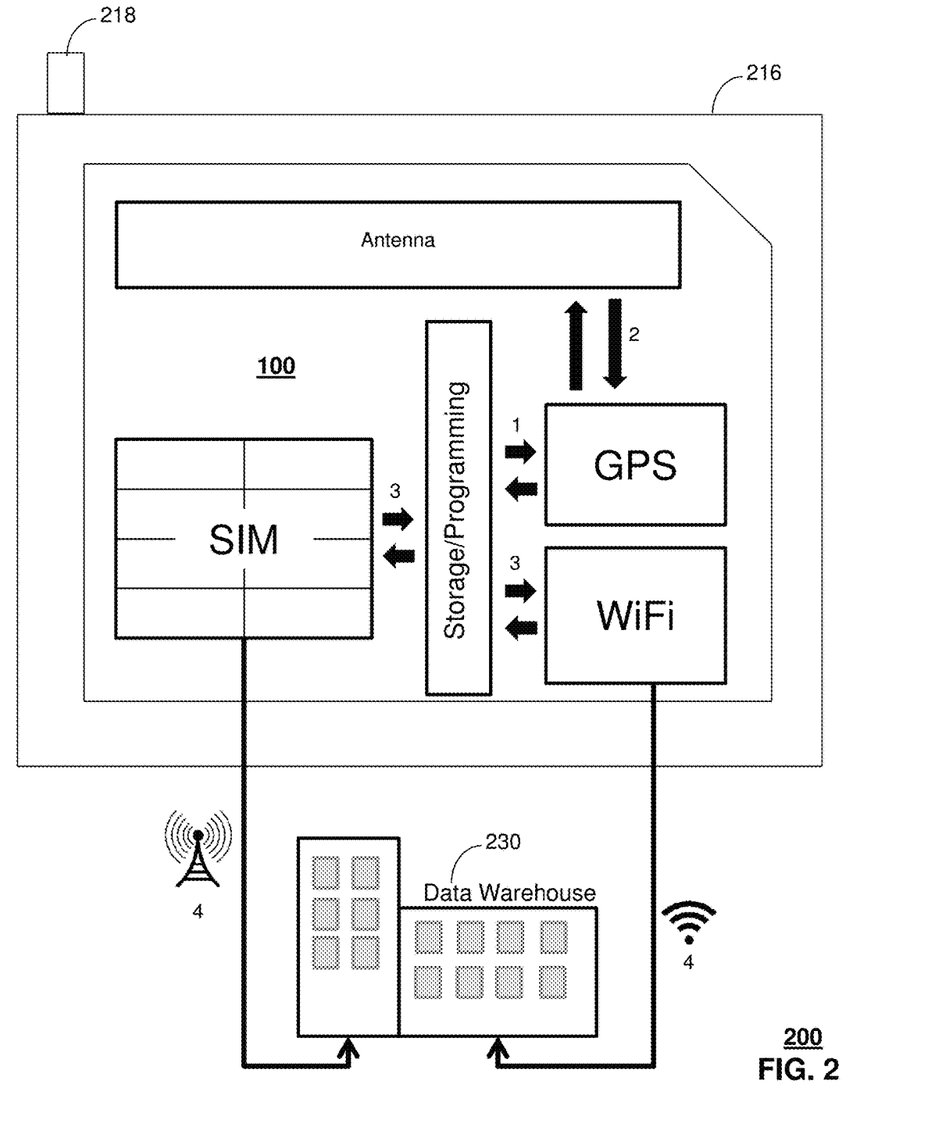
FIG. 2 depicts an illustrative embodiment of a system that can utilize the subscriber identity module of FIG. 1 for providing location-based services to, or storing location tracking information from, wireless communication devices.

FIG. 2 depicts an illustrative embodiment of a system 200 that enables location-based services to be provided to a wireless communication device 216 that has the SIM card 100. System 200 can include a data warehouse 230 which receives some or all of the data that is collected by the SIM card 100. Various other data associated with the wireless communication device 216 can also be stored at the data warehouse 230, such as subscriber information, data associated with other communication devices that are related to the device 216 (e.g., consumption history, user preferences, device configurations, and so forth).

In one embodiment at step 1, processor 110 can communicate with the GPS circuit 140 to trigger the GPS circuit to gather location data (e.g., time, events, geofences, and so forth). At step 2, the GPS circuit 140 can access the SIM antenna 120 to obtain the location data and can provide this information to a storage device of the SIM card. At step 3, other data can also be collected including one or both of cellular triangulation data and WiFi data. At step 4, when a connection satisfying a connection threshold is detected, the processor 110 can transmit all or some of the aggregated data via the SIM chip 150 (e.g., via the phone's antenna 218) or the WiFi circuit 130 to the data warehouse 230 for storage and/or analysis.

In one embodiment, aggregated data stored in the data warehouse 230 can be analyzed for providing location-based services to the wireless device 216. As an example, aggregated location data can be received by the data warehouse 230 from the WiFi circuit 130 and the SIM antenna 120 of the SIM card 100 without receiving the aggregated location data from a controller and a main antenna of the wireless device 216, where the controller and the main antenna enable wireless communication services for the wireless device, and where the aggregated location data includes GPS location data, WiFi location data, and communication session measurement data. In this example, the GPS location data can be collected by the GPS circuit 140 of the SIM card 100, while the WiFi location data is collected by the WiFi circuit 130, and while the communication session measurement data is collected by the controller of the wireless device 216. The aggregated location data can then be analyzed, such as by a location server, to determine a location of the wireless device 216. The location of the wireless device 216 can be transmitted to the wireless device to enable the controller to provide a location-based service at the wireless device.

In one embodiment, the transmitting of the location of the wireless device 216 to the wireless device can include: monitoring for a wireless network connection between the controller, via the main antenna, and a wireless network; and responsive to a failure to detect the wireless network connection between the controller and the wireless network, transmitting the aggregated location data to a wireless access point to cause the wireless access point to transmit the aggregated location data to the WiFi circuit 130 via the SIM antenna 120.

In one embodiment, the location-based service can include receiving product, location or other information associated with a product in proximity to the wireless device 216, where the product or other information is received from a content server responsive to the content server receiving the location of the wireless device, where the product information comprises a coupon associated with the product, and where the location of the wireless device indicates the proximity with respect to the product.

In one embodiment, the data being collected by the SIM card 100 can include one or more of Assisted GPS (AGPS) data, cellular triangulation data, GPS location data (e.g., latitude/longitude data), satellite location data paired with cellular location data on the device, WiFi network data (e.g., discovered WiFi networks that the WiFi chip detects and/or is connected to), and/or device diagnostic data and health information (e.g., utilized for predictions on when a new device may be needed).

In one embodiment, all or some of the collected data can be utilized in a location algorithm that can accurately determine a precise location of the wireless device, such as within proximity to a product in an aisle of a store. In one embodiment, AGPS and GPS data can be utilized together with WiFi information and data stored on the SIM card or in a remote data warehouse to enhance a location determination accuracy for the position of the wireless device.

In one embodiment, the aggregated data may be transferred from the SIM card through a connected device's built in antenna. When the connection is unavailable or it is otherwise not desired to utilize such a connection, the aggregated data may be transferred by the embedded WiFi chip (or other wireless communication circuit of the SIM card) through open WiFi hotspots.

In one embodiment, upon collection from the wireless device, the aggregated data can be stored and analyzed (e.g., in conjunction with other information received from other devices associated with the same subscriber) to understand and predict consumer behaviors and trends to assist in areas such as marketing, network improvement, public safety, and so forth.

Figure 3:
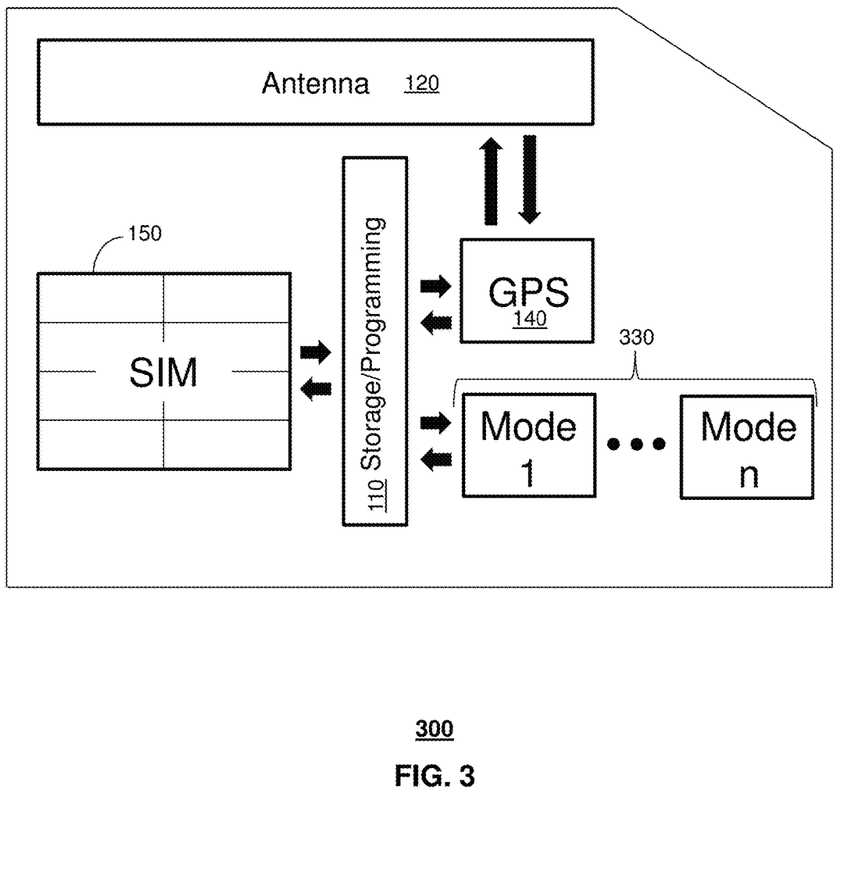
FIG. 3 depicts another illustrative embodiment of a subscriber identity module that enables transmitting of location data.

FIG. 3 depicts an illustrative embodiment of another SIM card 300 which includes various components described with respect to SIM card 100 including the processor 110, the SIM antenna 120, the GPS circuit 140 and the SIM chip 150. SIM card 300 can be a multi-mode device that enables providing wireless communications (via antenna 120) utilizing different communication protocols. As an example, the SIM card 300 can include a group of wireless communication chips 330 that each enable wireless communications via different wireless protocols, such as WiFi, Bluetooth, Near Filed Communications, and so forth. For instance, the processor 110 can select a target wireless protocol (as well as the corresponding wireless chip) from among the group of different wireless protocols for the wireless transmitting via the SIM antenna 120 to the wireless access point. In one embodiment, the selecting of the protocol and the wireless chip is according to performance parameters determined for the group of different wireless protocols; availability of the wireless access point for the group of different wireless protocols, or a combination thereof.

Figure 4:
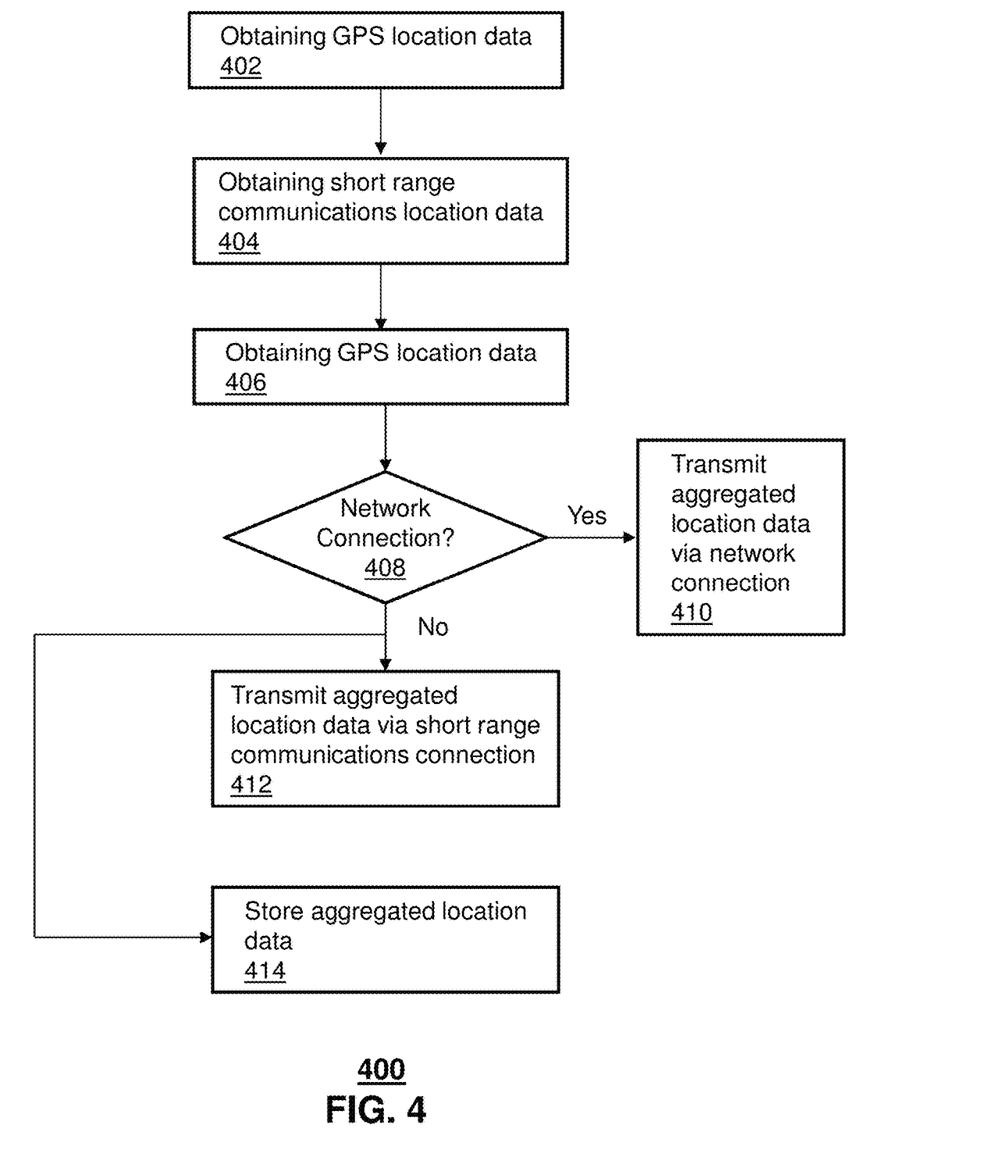
FIG. 4 depicts an illustrative embodiment of a method for providing or storing location data and location-based services for wireless communication devices.

FIG. 4 depicts an illustrative embodiment of a method 400 that can be used for providing location-based services. Method 400 can utilize SIM card 100 and/or 300, as well as other devices described in system 200. At 402, processor 110 of a SIM card can obtain, via the GPS circuit 140 and the SIM antenna 120, GPS location data. At 404, processor 110 can obtain, via the SIM antenna and a wireless communication circuit 130, second location data. At 406, processor 110 can obtain, via a controller and a main antenna of the wireless communication device, communication session measurement data. The GPS location data, the second location data and the communication session measurement data can be stored in a memory of the SIM card as aggregated location data.

At 408, monitoring can be performed to detect a wireless network connection between the wireless device's controller (e.g., a base-band processor and/or a phone CPU), via the main antenna, and a wireless network. At 410, if a network connection is detected then the processor 110 can provide the aggregated data to the wireless device's controller so that the aggregated data can be transmitted via the network connection. At 412, responsive to a failure to detect the wireless network connection between the wireless device's controller and the wireless network, the aggregated location data can be provided by the processor 110 to the wireless communication circuit 130 (e.g., a WiFi circuit) for wireless transmitting via the SIM antenna 120 to a wireless access point to cause the wireless access point to transmit the aggregated location data to a location server. At 414, responsive to a failure to detect the wireless network or a wireless access point, the location information data derived above can be placed in storage on the SIM card 100 by the processor 110 until the data can be transmitted by either the wireless network or a wireless access point.

In one embodiment, the wireless communication circuit 130 enables wireless communications via the SIM antenna 120 utilizing WiFi, Bluetooth, Near Field Communications, or a combination thereof. In one embodiment, the SIM card, responsive to a lack of the wireless network connection between the wireless device's controller and the wireless network, can receive, at the processor 110 via the SIM antenna 120 and the wireless communication circuit 130, a location of the wireless device from the location server, where the location of the wireless device is determined based on an analysis of the aggregated location data by the location server.

In one embodiment, the wireless communication circuit 130 can be a multi-mode device that enables wireless communications utilizing a group of different wireless protocols, where the processor 110 selects a target wireless protocol from among the group of different wireless protocols for the wireless transmitting via the wireless communication circuit 130 and the SIM antenna 120 to the wireless access point, and where the selecting is according to performance parameters determined for the group of different wireless protocols, availability of the wireless access point for the group of different wireless protocols, or a combination thereof.

In one embodiment, the providing of the aggregated location data to the wireless communication circuit 130 for the wireless transmitting to the wireless access point causes the wireless device's controller to receive (via the main antenna) product, location or other information associated with a product in proximity to the wireless device, where the product or other information is received from a content server responsive to the content server receiving a location of the wireless device from the location server, and where the location of the wireless device is determined based on an analysis of the aggregated location data by the location server.

Figure 5:
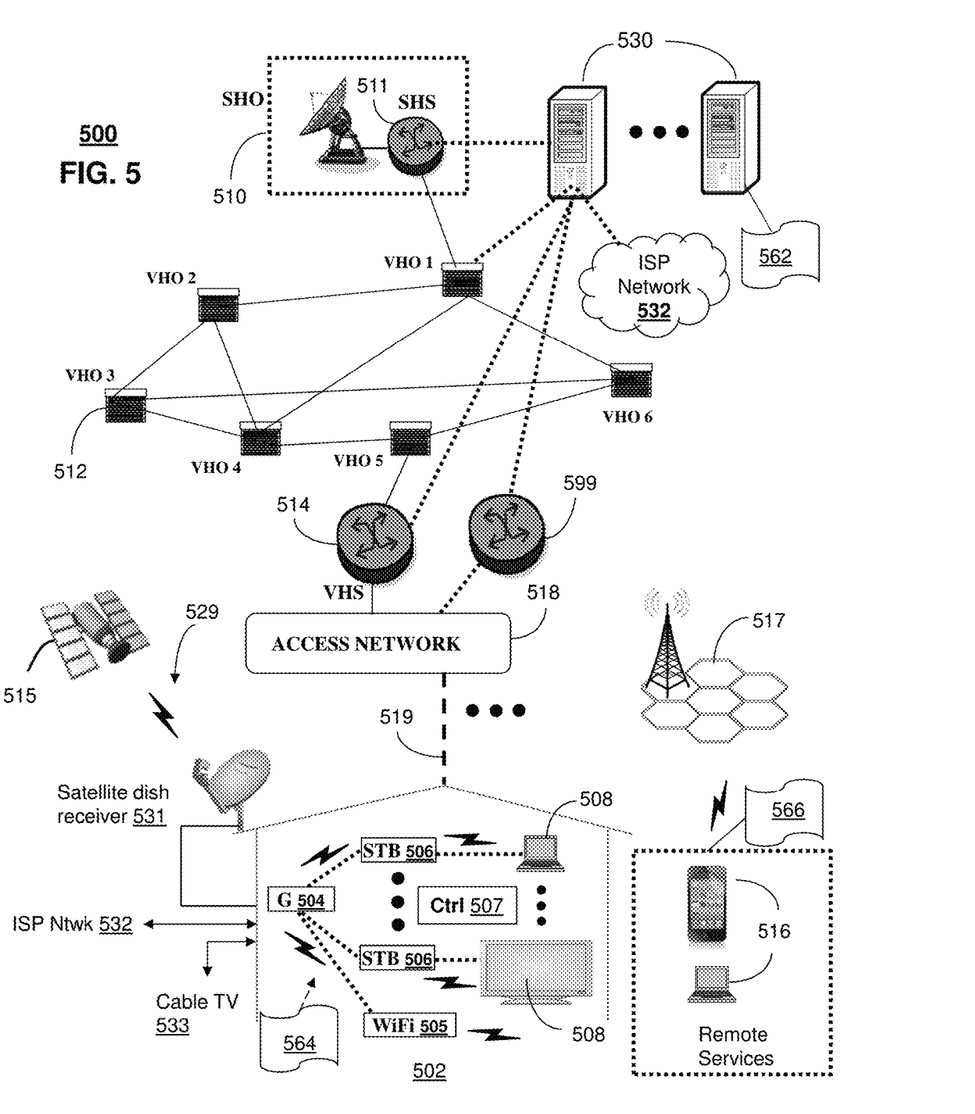
FIG. 5 depicts an illustrative embodiment of a communication system that provides communication services including location-based services.

FIG. 5 depicts an illustrative embodiment of a communication system 500 for delivering communication services, which can include location-based services. The communication system 500 can include an Internet Protocol Television (IPTV) media system. Communication system 500 can be overlaid or operably coupled with system 200 as another representative embodiment of communication system 500.

System 500 can be an IP video network which can be utilized for the transmission of the location information collected via SIM card 100. However, the location information collected via SIM card 100 can be transmitted by WiFi access to a broadband IP network that is used for such transmissions, such as through use of WiFi router 505 and/or a broadband network router 599.

For instance, one or more devices illustrated in the communication system 500 of FIG. 5 can provide a user with a location-based service through use of a SIM card that collects and transmits aggregated data, including various types of location data (e.g., GPS location data, WiFi location data, Cellular location data, and so forth). In one embodiment, system 500 enables receiving aggregated location data from a WiFi circuit and a SIM antenna of a SIM card of a wireless device without receiving the aggregated location data from a controller and a main antenna of the wireless device, where the controller and the main antenna enable wireless communication services for the wireless device. The aggregated location data can include GPS location data, WiFi location data, and/or communication session measurement data. The GPS location data can be collected by a GPS circuit of the SIM card. The WiFi location data can be collected by a WiFi circuit of the SIM card. The communication session measurement data can be collected by the controller of the wireless device. The aggregated location data can be analyzed to determine a location of the wireless device. The location of the wireless device can be transmitted to the wireless device to enable the wireless device's controller to provide a location-based service at the wireless device.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a location server (herein referred to as server 530). The server 530 can use computing and communication technology to perform function 562, which can include among other things, analyzing aggregated location data of a wireless device to determine an accurate location for the wireless device. The aggregated location data can include various forms of location data including GPS location data, WiFi location data, cellular location data, network location data, and so forth. For instance, function 562 of server 530 can be similar to the functions described for the data warehouse 230 of FIG. 2, the location server and/or the content server in accordance with method 400.

The media processors 506 can be provisioned with software functions 564 to provide additional data to the server 530, including media consumption history, user preferences, and so forth. The wireless communication devices 516 can be provisioned with software functions 566 to utilize the services of server 530. For instance, function 566 can be similar to the functions described for the wireless device 216 of FIG. 2 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Other communication systems can be utilized to provide location-based services, such as based on aggregated location provided via a SIM card, including an IP Multimedia Subsystem (IMS) network architecture to facilitate the combined services of circuit-switched and packet-switched systems.

Figure 6:
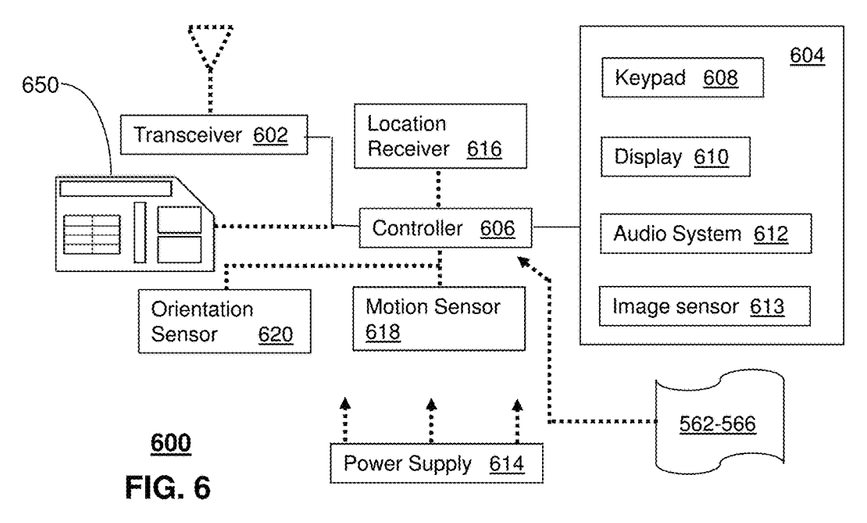
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1-3 and 5, and can be configured to perform portions of method 400. As an example, communication device 600 can: obtain, via a GPS circuit and a SIM antenna of a SIM card, GPS location data; obtain, via the SIM antenna and a wireless communication circuit of the SIM card, second location data; obtain, via a controller and a main antenna of the wireless device, communication session measurement data; store the GPS location data, the second location data and the communication session measurement data in a memory of the SIM card as aggregated location data; monitor for a wireless network connection between the controller, via the main antenna, and a wireless network; and responsive to a failure to detect the wireless network connection between the controller and the wireless network, provide the aggregated location data to the wireless communication circuit for wireless transmitting via the SIM antenna to a wireless access point to cause the wireless access point to transmit the aggregated location data to a location server.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics) and could use biometric sensors for example to activate the device or take biometric readings.

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing a SIM card 650. The SIM card 650 can be used for identifying subscriber services, executing programs, storing subscriber data, and so forth. The SIM card 650 can include one or more of the components described with respect to SIM cards 100, 300, including a processor, a wireless communication circuit, a GPS circuit, a SIM antenna and a SIM chip.

The communication device 600 as described herein can operate with more or less of the circuit components shown in FIG. 6. These variant embodiments can be used in one or more embodiments of the subject disclosure.

The communication device 600 can be adapted to perform the functions of SIM cards 100, 300, wireless device 216, data warehouse 230, the media processor 506, the media devices 508, or the portable communication devices 516. It will be appreciated that the communication device 600 can also represent other devices that can operate in systems 200, 500, and/or perform some or all of the steps in method 400. In addition, the controller 606 can be adapted in various embodiments to perform the functions 562-566.

Upon reviewing the aforementioned embodiments, it would be evident to an artisan with ordinary skill in the art that said embodiments can be modified, reduced, or enhanced without departing from the scope of the claims described below. For example, the SIM card can be an embedded device in the wireless device which is not removable. In another embodiment, the SIM card can be a multi-mode/multi-antenna device capable of wirelessly transmitting communications, separately or simultaneously, utilizing different protocols over different antennas of the SIM card. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

In one embodiment, the aggregated data or portions thereof can be utilized for performing multiple location determinations which can then be compared to further improve accuracy of the location determination. For example, the processor 110 of the SIM card 100 can perform a first location determination based on all or some of the aggregated location data. The controller of the wireless device can perform a second location determination base done data available to the controller, such as network data, cell tower data, cellular triangulation data, and so forth. This data can be different or the same (in whole or in part) from the data that is utilized by the SIM card processor 100 for performing the first location determination. A remote location server can perform a third location determination according to the aggregated data obtained from the SIM card. This third location determination can be based on the aggregated data alone or can be supplemented with additional information available the location server, such as network conditions and so forth. In one embodiment, the three location determinations can be compared to determine whether they are within a threshold of each other. If they are within a threshold of each other then the location determinations can be deemed accurate. If they are not within a threshold of each other, one or more of the determinations can be discarded or additional data can be collected to repeat the three location determinations.

Figure 7:
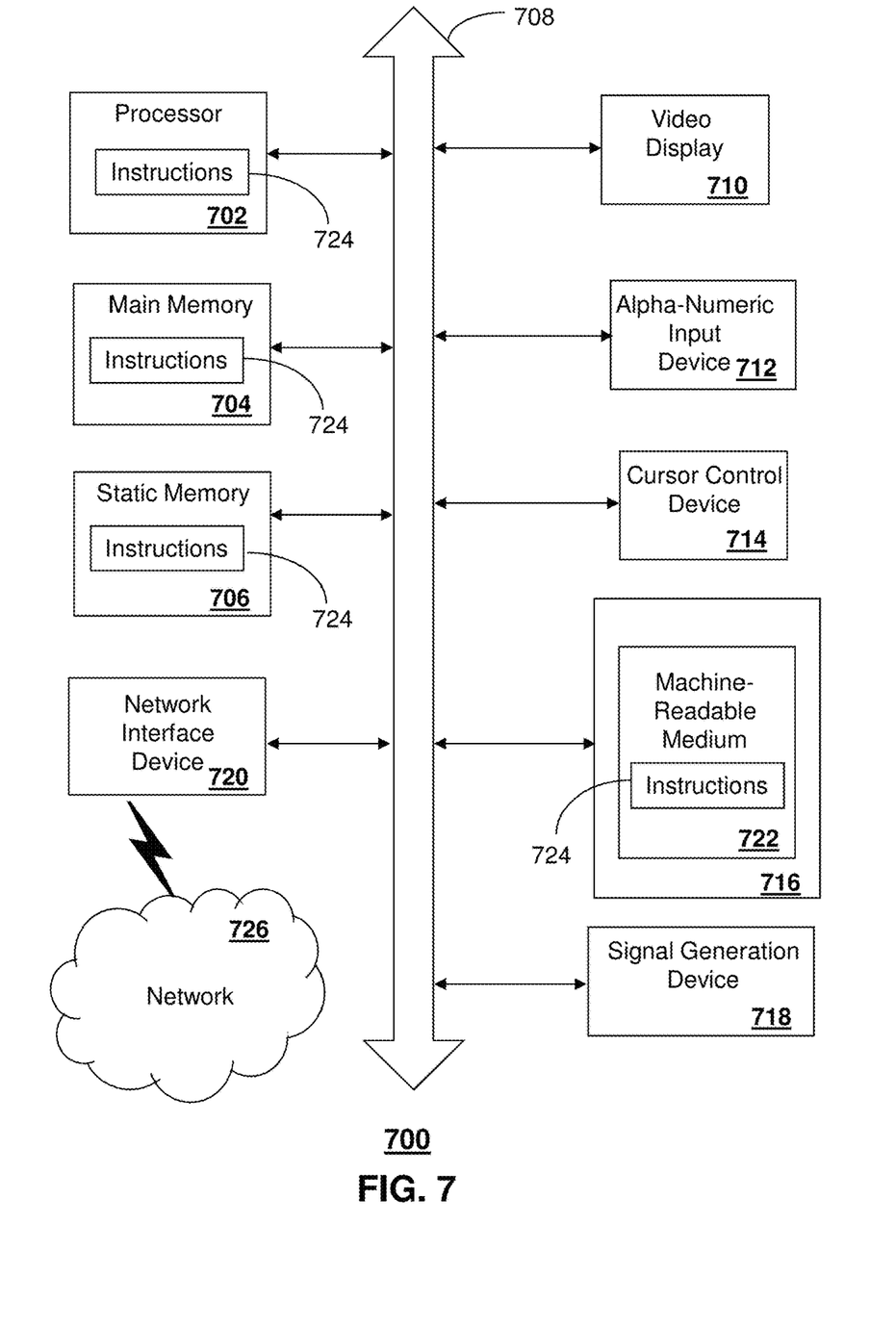
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the SIM card 100, 300, 650, the data warehouse 230, the server 530, the communication device 600 and other devices of FIGS. 1-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

For example, the machine 700 can obtain, via a GPS circuit and a SIM antenna of a SIM card, GPS location data; obtain, via a WiFi circuit and the SIM antenna, WiFi location data; obtain, via a wireless device controller and a main antenna, communication session measurement data; store the GPS location data, the WiFi location data and the communication session measurement data in a memory of the SIM card as aggregated location data; responsive to a detection of a wireless network connection between the controller, via the main antenna, and a wireless network, provide the aggregated location data to the controller for wireless transmitting to a location server; and responsive to a failure to detect the wireless network connection between the wireless device controller and the wireless network, provide the aggregated location data to the WiFi circuit for wireless transmitting via the second antenna to a wireless access point to cause the wireless access point to transmit the aggregated location data to the location server.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a main antenna;
a WiFi circuit;
a subscriber identity module (SIM) having a SIM memory;
a SIM antenna;
a global positioning system (GPS) circuit;
a wireless circuit;
a processing system including a processor; and
a memory that stores executable instructions that, when executed by the processing system, facilitate performance of operations, comprising:
obtaining GPS location information from the GPS circuit;
obtaining, via the WiFi circuit and the SIM antenna, WiFi location data;
storing the GPS location information and the WiFi location data in the SIM memory as aggregated location data;
responsive to a detection of a wireless network connection between the processor, via the main antenna, and a wireless network, providing the aggregated location data to the processor for wireless transmitting to a location server;
determining a failure to detect a wireless network connection via the main antenna; and
responsive to the determining the failure to detect the wireless network connection via the main antenna, providing the aggregated location data to the location server via the wireless circuit and the SIM antenna.

2. The communication device of claim 1, wherein the operations further comprise receiving a location-based service from the location server according to the GPS location information.

3. The communication device of claim 2, wherein the operations further comprise:
obtaining communication session measurement data, wherein the aggregated location data further comprises the communication session measurement data; and
transmitting the communication session measurement data to the location server via the wireless circuit and the SIM antenna, wherein the receiving of the location-based service comprises receiving the location-based service according to the communication session measurement data.

4. The communication device of claim 2, wherein the receiving of the location-based service comprises receiving the location-based service from the location server according to network location data, wherein the location server obtains the network location data from one or more network devices.

5. The communication device of claim 4, wherein the network location data includes one of assisted GPS data, cellular triangulation data, satellite location data, WiFi network data, communication device diagnostic data, and communication device health information.

6. The communication device of claim 1, wherein the providing of the GPS location information to the location server comprises determining a group of wireless protocols supported by the wireless circuit and selecting a target wireless protocol from the group of wireless protocols.

7. The communication device of claim 6, wherein the selecting the target wireless protocol from the group of wireless protocols comprises determining a performance parameter for each wireless protocol from the group of wireless protocols resulting in a group of performance parameters and selecting the target wireless protocol according to the group of performance parameters.

8. The communication device of claim 6, wherein the selecting the target wireless protocol from the group of wireless protocols comprises determining availability of a wireless access point for each wireless protocol from the group of wireless protocols resulting in a group of wireless access points and selecting the target wireless protocol according to the availability of the group of wireless access points.

9. The communication device of claim 6, wherein the group of wireless protocols includes one of a WiFi, Bluetooth, and Near Field Communications.

10. A non-transitory machine-readable storage medium, comprising executable instructions that, when executed by a processing system including a processor, facilitate performance of operations, comprising:

obtaining GPS location information from a GPS circuit via a main antenna;

obtaining wireless location data via a wireless circuit utilizing the main antenna;

storing the GPS location information and the wireless location data in a subscriber identity module (SIM) memory as aggregated location data;

responsive to a detection of a wireless network connection between the processor and a wireless network via the main antenna, providing the aggregated location data to the processor for wireless transmission to a location server;

responsive to a determination of a failure to detect the wireless network connection via the main antenna, providing the aggregated location data to the location server via the wireless circuit and a SIM antenna; and receiving a location-based service from the location server according to the GPS location information.

11. The non-transitory machine-readable storage medium of claim 10, wherein the operations further comprise: obtaining communication session measurement data; and transmitting the communication session measurement data to the location server via the wireless circuit and the SIM antenna, wherein the receiving of the location-based service comprises receiving the location-based service according to the communication session measurement data.

12. The non-transitory machine-readable storage medium of claim 11, wherein the receiving of the location-based service comprises receiving the location-based service from the location server according to network location data, wherein the location server obtains the network location data from one or more network devices.

13. The non-transitory machine-readable storage medium of claim 12, wherein the network location data includes one of assisted GPS data, cellular triangulation data, satellite location data, WiFi network data, communication device diagnostic data, and communication device health information.

14. The non-transitory machine-readable storage medium of claim 10, wherein the providing of the GPS location information to the location server comprises determining a group of wireless protocols supported by the wireless circuit and selecting a target wireless protocol from the group of wireless protocols.

15. The non-transitory machine-readable storage medium of claim 14, wherein the selecting the target wireless protocol from the group of wireless protocols comprises determining a performance parameter for each wireless protocol from the group of wireless protocols resulting in a group of performance parameters and selecting the target wireless protocol according to the group of performance parameters.

16. The non-transitory machine-readable storage medium of claim 14, wherein the selecting the target wireless protocol from the group of wireless protocols comprises determining availability of a wireless access point for each wireless protocol from the group of wireless protocols resulting in a group of wireless access points and selecting the target wireless protocol according to the availability of the group of wireless access points.

17. A method, comprising:

obtaining, by a processing system including a processor, GPS location information from a GPS circuit via a first antenna;

obtaining, by the processing system, wireless location data via a wireless circuit utilizing the first antenna;

storing, by the processing system, the GPS location information and the wireless location data in a subscriber identity module (SIM) memory as aggregated location data;

responsive to a detection of a wireless network connection between the processor and a wireless network via the first antenna, by the wireless circuit providing the aggregated location data to the processor for wireless transmission to a location server;

responsive to a determination, by the processing system, of a failure to detect the wireless network connection via the first antenna:

determining a group of wireless protocols supported by the wireless circuit;

selecting a target wireless protocol from the group of wireless protocols; and providing, by the processing system, the aggregated location data to the location server via the wireless circuit and a second antenna according to the target wireless protocol.

18. The method of claim 17, wherein the selecting the target wireless protocol from the group of wireless protocols comprises determining, by the processing system, a performance parameter for each wireless protocol from the group of wireless protocols resulting in a group of performance parameters and selecting, by the processing system, the target wireless protocol according to the group of performance parameters.

19. The method of claim 17, wherein the selecting the target wireless protocol from the group of wireless protocols comprises determining, by the processing system, availability of a wireless access point for each wireless protocol from the group of wireless protocols resulting in a group of wireless access points and selecting, by the processing system, the target wireless protocol according to the availability of the group of wireless access points.

20. The method of claim 17, wherein the group of wireless protocols includes one of a WiFi, Bluetooth, and Near Field Communications.

* * * * *